United States Patent [19]

Vilaire et al.

[11] Patent Number: 5,229,594
[45] Date of Patent: Jul. 20, 1993

[54] METHOD OF MEASURING THE EXACT POSITION OF THE ENERGY CENTER OF AN IMAGE SPOT OF A BRIGHT OBJECT ON A PHOTOSENSITIVE DETECTOR

[75] Inventors: Didier Vilaire, Paris; Christian Pezant, Villecresnes, both of France

[73] Assignee: U.S. Philips Corporation, New York, N.Y.

[21] Appl. No.: 834,028

[22] Filed: Feb. 11, 1992

[30] Foreign Application Priority Data

Feb. 15, 1991 [FR] France .................. 91 01814

[51] Int. Cl.$^5$ ............................................. G01B 11/26
[52] U.S. Cl. .................. 250/206.2; 356/152; 250/203.3
[58] Field of Search ............... 250/203.3, 203.6, 206.2, 250/206.3, 206.4; 356/141, 152; 244/3.16

[56] References Cited

U.S. PATENT DOCUMENTS

| | | | |
|---|---|---|---|
| 3,640,628 | 2/1972 | Jones | 250/203.3 |
| 4,710,028 | 12/1987 | Grenier et al. | 356/141 |
| 4,713,533 | 12/1987 | Bremer et al. | 250/203.1 |
| 4,979,221 | 12/1990 | Perryman et al. | 250/206.1 |
| 5,068,522 | 11/1991 | Falp et al. | 250/206.1 |

Primary Examiner—David C. Nelms
Assistant Examiner—S. Allen
Attorney, Agent, or Firm—Robert J. Kraus

[57] ABSTRACT

The detector is a charge transfer detection matrix and the measurement is effected by barycentric calculation. The stages of the method are as follows: Centering the measuring field (30) around the estimated position of the bright object (PI(1); selecting a first group of NS brightest pixels (31); selecting from these NS pixels the NA pixels clustered around the pixel having the maximum level (37); finally performing a barycentric calculation on the only clustered NA pixels (IE) of the measuring field.

7 Claims, 2 Drawing Sheets

METHOD OF MEASURING THE EXACT POSITION OF THE ENERGY CENTER OF AN IMAGE SPOT OF A BRIGHT OBJECT ON A PHOTOSENSITIVE DETECTOR

BACKGROUND OF THE INVENTION

The present invention relates to a method of measuring the exact position of the energy centre of an image spot of a bright object on a photosensitive detector constituted by a charge transfer detection matrix, said image spot being defocused to allow a subsequent barycentric calculation mode of said exact position and the luminous signal being digitized and thereafter processed in the form of digital pixels.

A charge transfer detection matrix is a device having a photosentive mosaic which, in response to an incident light ray, produces a video signal consisting of a pulse train whose individual amplitudes are proportional to the quantity of energy of the photons in each sensitive element of the device. Such a device is used more specifically in mosaic detectors employed in astronomical view finders and in space technology as a camera for the photography of (high magnitude) weak stars.

The mosaic detectors comprising a large number of new-generation sensitive elements are combined with high-speed microprocessors to provide star-tracking arrangements and instruments capable of tracking an apparently fast moving star. In these arrangements, which are intended for space missions, it is essential that the position of the energy centre of an image spot on the detection matrix be determined and recorded with high precision, in fact a precision equal to a fraction of the picture element or pixel. Such an accurate detection typically having an accuracy of one-tenth of the side of a pixel, will be specified in the sequel of the text of the measuring stage.

In order to reduce the processing time for the determination of the position of a star, one can first of all determine its approximate position so that, for the measurement, only a limited zone around the image spot must be considered. This preliminary stage, the search stage, is effected in a portion of the image zone of the detection matrix, denoted search window, whose dimensions depend on the estimated position of the star and the associated uncertainty.

This search window, which constitutes a square or rectangular subassembly of the detection matrix of the order of some hundreds of pixels, the still further limited zone whose position is derived from the search stage and to which the calculating algorithms are applied, is denoted the measuring field. The measuring field which itself forms a generally square subassembly of the search window, is made as small as possible and, typically, can vary from a 4 by 4 pixel pattern to a square pattern which may contain several hundreds of pixels. Calculating the position in the measuring stage can be effected, for example, in the manner described in the French patent application No. 2 625 396, corresponding to U.S. Pat. No. 4,979,221, wherein a memory is accessed which contains the precalculated positions of the centre of the luminous signal as a function of the signal levels found over the 5 pixels nearest to the centre. The precision obtained in accordance with this procedure and the device associated therewith is equal to one quarter of the side of a pixel.

SUMMARY OF THE INVENTION

It is an object of the present invention to obtain a precision better than the precision described in the foregoing and at least equal to one tenth of the side of a pixel, which is obtained by means of a state of the art different from the state described in said French patent application: the measuring field being centred around the estimated position of the star, either after a search stage, or after a just preceding measuring stage, calculating the position is effected in known manner using the trick of a barycentric calculation exercised on the set of pixels of a measuring field having such a dimension that all the pixels illuminated by the star in the viewfinder and having a significant level, i.e. the level exceeds the background noise, are taken into consideration. When the uncertainty about the position of the image spot is great, the measuring field is consequently also large and a significant number of non-significant pixels are taken into account, which degrades the accuracy of the measuremenet. It will furthermore be noted that, in order to improve the precision in the measuring stage, it is known to defocus slightly and permanently the detection matrix relative to the view finder. The optimum defocusing is such that the apparent diameter of the star aimed at, whatever its magnitude, is of the order of 2 to 2.5 times the side of a pixel.

In this context, the precise technical problem encountered is to obtain from a barycentric calculation a precision as regards the position of the centre of the image spot of the star in the view finder better than one tenth of the side of a pixel, whilst at the same time being affected to the least possible extent by the noise contained in the measuring field in the form of pixels illuminated by photons not originating from the star in the viewfinder.

This object is achieved and the disadvantages of the prior art consisting in an insufficient accuracy are obviated by the fact that the method defined in the opening paragraph is characterized, in that, in a measuring field forming a rectangular or square portion of the said detection matrix, the following consecutive operations are performed in each measurement:

a) the measuring field is centred around the estimated position of the bright object determined in a measuring stage or a just preceding search stage;

b) selection of a first group of pixels NS of the highest level having a predetermined number of the order of one tenth of the number of pixels of the measuring field;

c) selection, from the NS pixels, of a further group of NA pixels clustered around the maximum level;

d) a barymetric calculation is performed on the clustered NA pixels of the measuring field.

In the method in accordance with the invention a double segregation is effected which consists in removing from the barycentric calculation on the one hand the pixels which have a high level but do not belong to the image spot and on the other hand in rejecting the pixels which belong to the image spot but whose level is not significant relative to the background noise. The method is particularly interesting for use in borderline detection cases such as: the star has a high magnitude, high speed, little known or unknown direction of movement. The gain in measuring noise thus obtained may then be higher by a factor of two compared with a measurement of a fixed pattern. The value of NS is optimized as a function of the features of a mission intended for such a satellite.

In accordance with a preferred embodiment of the invention as regards the selection of the NS pixels, the NS first pixels read from the measuring field are entered into a memory zone having a capacity of NS pixels, each location of which contains the value of the pixel and its cartesian coordinates, thereafter the subsequent pixel is compared to the smallest of the preceding pixels and, when this pixel is higher, it replaces it in said memory, if it is not higher said subsequent pixel is rejected and the same operation is repeated for the next pixel, and so forth until the last pixel read from the measuring field.

This embodiment constitutes an algorithm in accordance with which the NS memory locations contain the NS highest level digital pixels of the measuring field in any sequence within the memory zone. In accordance with further known algorithms, or in accordance with a complementary algorithm, it is possible to obtain these pixels arranged in an ascending or descending order within the memory zone.

In accordance with a further preferred embodiment of the invention, as regards the selection of said NS pixels forming the greatest cluster, a spiral exploration of the measuring field is effected, centred around the pixel having the maximum level, PI(1) which belongs to a group NA, using the following steps:

p) by comparing the coordinates it is determined whether the pixel $PS_S$ belongs to said first group of NS pixels and if this is not the case one proceeds to step r;

q) if yes, the position of the pixel $PS_S$ is compared to the position(s) of the preveously selected pixel(s) and, if contiguous to at least one of these pixels, the pixel $PI_S$ is considered as belonging to the said other group of NA pixels, its position is considered as being the start of a completely empty turn of the spiral and thereafter one proceeds to the step r; if there is no contiguity, one directly proceeds to step r;

r) for each successive position of the explored pixel $PI_S$ of the spiral it is tested whether this pixel marks the end of a completely empty turn, in which case the exploration is ended, if not one passes to the next pixel of the spiral.

For each precise measurement of the position of a star a certain period of time is required to effect the above-described pixel segragation. It will be noted that this loss of time is counteracted by the greater simplicity and the speed of the barycentric calculation which from now on does only apply to a small minority of the pixels of the measuring field.

BRIEF DESCRIPTION OF THE DRAWING

The following description, which is given by way of example with reference to the accompanying drawings, will make it better understood how the invention can be put into effect.

DESCRIPTION OF PREFERRED EMBODIMENTS

Figure 1:
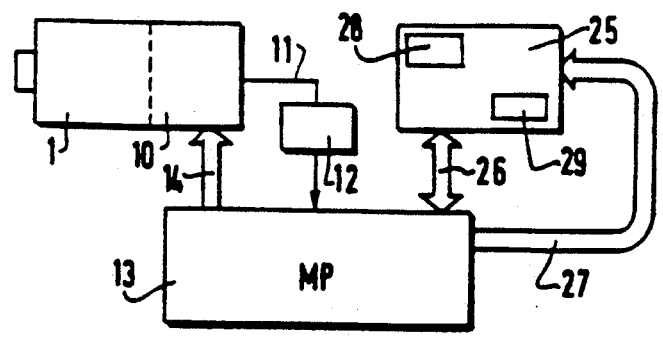
FIG. 1 is a block circuit diagram of an arrangement for putting the method of the invention into effect.

Generally, an astronomical viewfinder comprising a charge transfer detection matrix formed by pixels, is intended to control the behaviour of artificial satellites and, consequently, only needs to have a slow rotational motion, matched to the period of rotation in an orbit. In the present case, the invention preferably relates to a manoeuvrable satellite. Handling a satellite implies a rotational motion which is significantly faster than for a simple behaviour control, the rate of angular motion typically being equal to 0.5 degree per second for a measuring accuracy of the order of 20 seconds of arc on an average. Such a shift is, for example, equal to a displacement 9 r (r being the length of the side of a pixel) of the star in the viewfinder between two consecutive measurements with a one second interval, the measuring accuracy always being equal to 0.1 r. If the anticipated angular shift covers several dozens of degrees, several stars forming, on the celestial sphere, a path which has been preestablished in a star cataloque on board the satellite, are utilized for effecting the relevant manoeuver. To this effect, a coarse positioning is established by the inertia station of the satellite to provide that the image of a predetermined star of the chosen star track, denoted star A, is formed on the detection matrix, this image being slightly defocussed so as to illuminate a plurality of pixels. Thereafter, a what is called search stage allows the localization of the pixel (or alternatively a square group of 4 or 9 pixels) having the maximum level illuminated by the star A in a search window which forms a sub-assembly of the detection matrix. This (these) pixel(s) with the maximum level constitute(s) the estimated position of the star A. At this stage, steering of the satellite can be effected by consecutive measurements with a precision of one tenth of a pixel, of the exact position of the stars which succeed each other in the said star track. At the end of the search stage, the measuring field is centered around the estimated position of the first star in sight, i.e. star A. The measuring field, which is smaller than the search window, is generally square and may be as small as 5×5 pixels.

Typically, the measuring field includes 10×10 to 15×15 pixels. Preferably, to facillitate centring of the measuring field around a star, the latter has an odd number of pixels, irrespective of the fact whether it concerns its side or its surface. For a small measuring field, the successive measuring fields may be separated one from the other and the measurements must be brough closer to each other in the time; in contradistinction thereto, for square windows from 10 to 15 pixels, the consecutive measuring fields can be partially suppressed. Acting thus, the point is reached, measurement after measurement, at which the image of star A leaves the matrix and the next measuring field is then centered around the image of a star B appearing in the matrix, the star B being the star that follows after the star A in the star path mentioned in the foregoing. It will be noted that, from measurement to measurement, for a given star the new measuring field is readjusted by centring it around a pixel whose position is derived from the position just measured, corrected for the estimated apparent motion of the star which is indeed known, during the time interval between two measurements. Controlling the orientation of the satellite during a manoeuver described in the preceding sentences is effected in known manner, preferably by effecting, for each measurement, a barycentric calculation which up till now covers all the pixels of the measuring field. This renders it possible to obtain, after a rather long calculation, an accuracy of the order of 0.1 r. A significantly better accuracy would be illusory given the fact that other factors prevent (at least for the moment) a greater accuracy. These factor are more specifically: geometrical errors of the viewfinder, thermal stability and field stability errors, pixel sensitivity errors.

The present invention renders it possible, whilst performing the measurement in accordance with a known barycentric calculation, to obtain, by means of this calculation, a greater accuracy on the basis of a smaller number of pixels used for the calculation than in the prior art. This general advantage can be utilized in different manners, all other matters being the same. It becomes, for example, possible to choose a larger measuring field and to increase the interval between measurements. It also becomes possible to integrate, in the said star path, stars having a higher magnitude than before or stars which are near stars of a higher magnitude than their own magnitude, so that it is possible to make the star paths in question more regular and denser.

FIG. 1 shows an astronomical viewfinder 1 having a charge transfer detection matrix 10. Reading the pixels from the matrix 10 (with or without memory zone) is effected in a known conventional manner, that is to say pixel-sequentially in an output stage (not shown). The signal is applied in the analog form by an output conductor 11 to an analog-to-digital converter 12 connected to a microprocessor MP, 13. The microprocessor 13 controls, by means of a control bus 14, the assembly (1, 10), the read control phases of the matrix in particular; it has its other side connected to a RAM memory 25 via a bidirectional data bus 26 and an address bus 27. As more detailed explanations are not given, the circuit diagram of FIG. 1 is of the conventional type. Only the structure and the usage of the memory 25 are original and are adapted to the invention, as described hereinafter. The detection matrix 10 (not shown), for example the matrix marketed by the firm of Thomson-CSF under type designation TH 7863, is in the form of a mosaic of image elements split into two parts: a first half, the photosensitive zone, is intended to receive and detect, during an integration period, the light radiation from the object aimed at and the second half, covered by an opaque film, serves as a transfer memory from which reading of the signal in the analog form is effected, pixel-by-pixel in each line and line-sequentially in the field, or in the form of square groups of 4 or 9 pixels.

Figure 2:
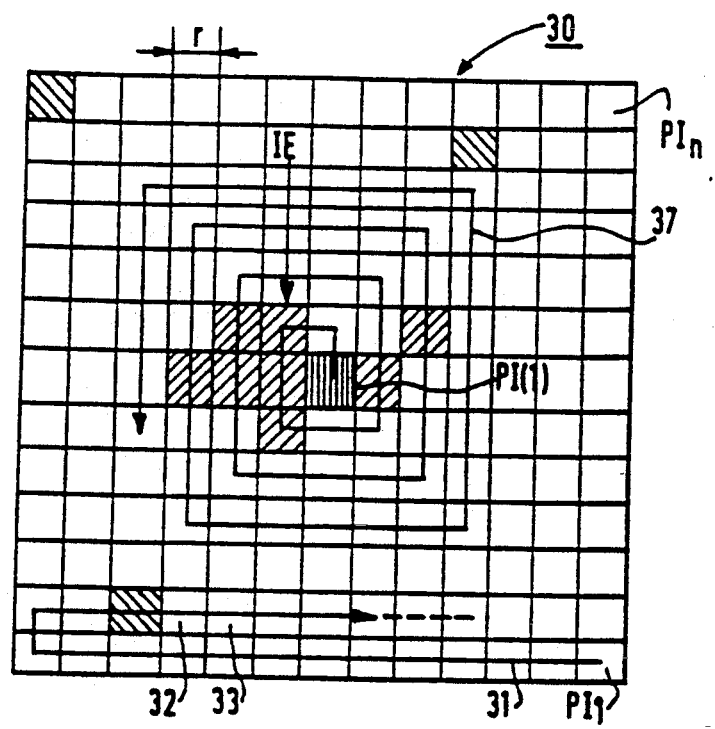
FIG. 2 shows the portion of the detection matrix denoted measuring field in which the image spot is contained.

FIG. 2 shows, of the matrix 10, the measuring field 30 containing the image of a star IE to which the pixel having the maximum level PI(1) belongs. The measuring field has 13×13 pixels and the background forming part of the field, is formed by 48 pisels situated at the periphery of the measuring field. This background, which serves as a low reference level for the determination of the value of the digital pixels in the microprocessor 13, is formed by the mean value of these 48 pixels constituting the periphery. When the background comprises pixels of a higher level, as defined hereinafter, these pixels are not included in the calculation of the means value. In addition to the pixel PI(1), 8 further pixels can be counted clustered around the maximum with PI(1), which are represented by hatched lines running in one direction, and three isolated pixels, represented by hatched lines running in the opposite direction, one of which, in the upper left corner, must be removed from the background. The assembly of these 12 pixels forms a first group of NS pixels of the highest level PI(1), . . . , PI(NS) in a decreasing order of levels. In accordance with the invention, these NS pixels are selected in a first period of time, in each measurement. In addition, a further limited group of NA pixels is selected from this further group. This further group, forming a larger cluster of pixels, is the group containing the maximum pixel PI(1). In FIG. 2 the group formed by PI(1) and the 8 adjacent pixels shown by hatched lines running in a first direction are concerned. A pixel is said to be clustered when it differs by an increment of 1 at most in x and/or y relative to a further likewise clustered pixel. This second selection consists in cancelling, from the highest level NS pixels, those pixels which are isolated, i.e. have the highest probability of being representative of noise in the measuring field. It will moreover be noted that a further cluster of pixels which is, for example, the image of a less bright star, may exist, but that it differs from the largest by the fact that it does not contain a pixel PI(1) of the highest level. Statistically, the noise has a gravity centre which is very near the centre of the measuring field. On the other hand, the position of the centre looked for can experimentally be located at a significant distance from the measuring field centre. This shows that it is very advantageous, for a gain in precision, to get rid of isolated pixels in the ultimate barycentric calculation, during each measurement.

Figure 3:
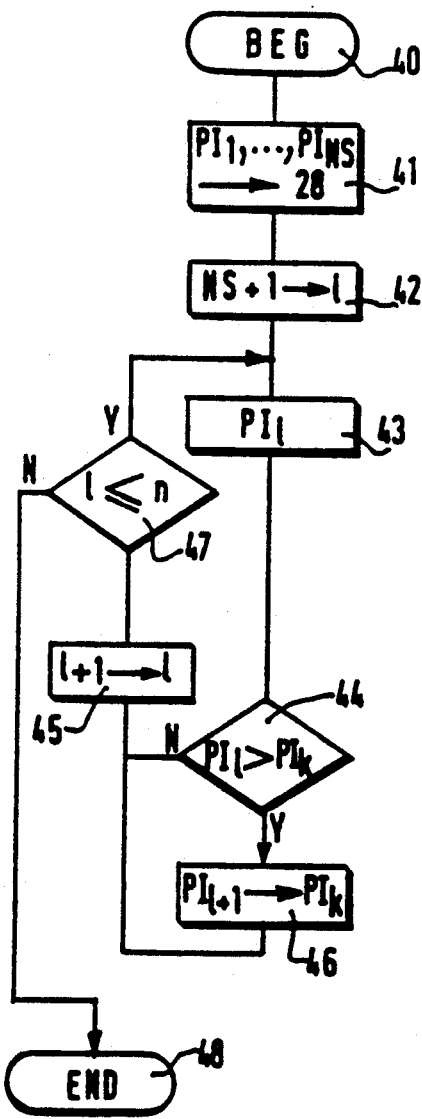
FIG. 3 is a flow chart of a first preferred embodiment of the invention.

FIG. 3 is the flow chart of an embodiment of the selection stage of the group of NS pixels having the highest level. The memory RAM 25 (FIG. 1) comprises, in accordance with the invention, a particular zone 28 of NS pixels. Each location of the zone 28 contains the value of the level of a pixel and its cartesian coordinates at x and y. The block 40 (BEG) marks the beginning of the programme. At block 41 the NS first pixels, $PI_1, \ldots, PI_{NS}$, are stored in the memory zone 28 (a possible choice is, for example, NS=16). Reading the measuring field is effected along line 31 in FIG. 2. At 42 the equality: NS+1=1 (pixel 32) is effected, 1 being the running number of the pixel being processed in the field along line 31 (FIG. 2). At block 43, the pixel $PI_1$ is taken for the sequel of the processing operation (pixel 32, FIG. 2). At 44 it is tested whether $PI_1$ exceeds the smallest ($PI_k$) of the pixels $PI_1, \ldots, PI_{NS}$ (pixel of the order k, k≦NS. If not, (N) one proceeds to block 45 at which 1 is incremented by one unit. If yes (Y), the pixel $PI_{1+1}$ replaces the pixel $PI_k$ in the memory zone 28 (block 46) and one proceeds to the block 45. In the next block 47, the value 1 is compared to n, which is the number of pixels of the measuring field (n=169, FIG. 2). For 1≦n (Y), a feedback to the block 43 is effected and the subsequent pixel (33, . . . ) is processed. If not (N), this indicates that the last pixel ($PI_n$ FIG. 2) has just been processed, and that the selection stage of the first group of NS highest-level pixels has ended (passage to end-of-programme block END in block 48). At this stage, the memory zone 28 contains the NS pixels of the highest level, i.e. the pixel PI(1) and the other hatched pixels in the example shown in FIG. 2, these pixels moreover not being arranged according to their amplitudes. For the performance of the subsequent stages of the measuring procedure it can be provided that the NS pixels of the highest level contained in the memory zone 28 are rearranged, in accordance with a specific complementary sub-programme of the microprocessor 13, in this memory zone 28 or a different memory zone of the largest PI(1) or smallest PI(NS). This first selection having been achieved, a second selection of a second group of maximally clustered NA pixels is effected from the NS of the highest level, for example as described hereinafter with reference to FIGS. 2 and 4.

Figure 4:
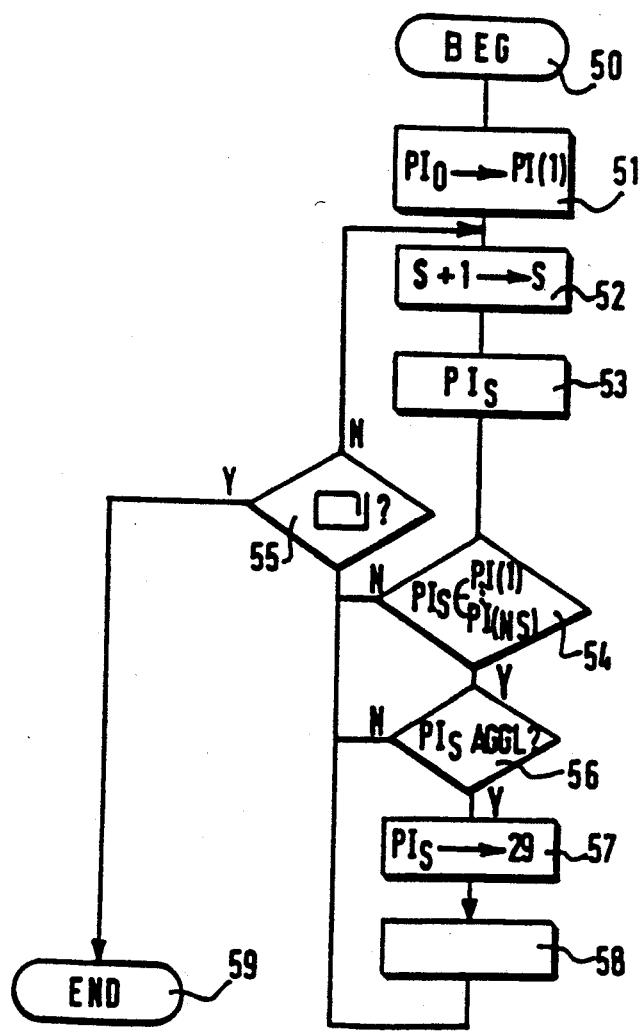
FIG. 4 is a flow chart of a second preferred embodiment, which is compatible with the flow chart of FIG. 3.

In FIG. 4, the block 50 (BEG) marks the beginning of the programme. At block 51, the start of a spiral scan 37 is based on the highest-level pixel PI(1) (see FIG. 2). At the subsequent block, 52, the number of the order S of the pixel to be processed on the spiral 37 is incremented by one unit (S+1→S). At 53 the pixel $PI_S$ is taken for the sequel of the processing operation. Then one proceeds to the subsequent block 54 which is a test formed by determining whether the pixel $PI_S$ belongs or does not belong to the first group of NS pixels. If no, (N), one proceeds to the test block 55 which will be described hereinafter. If yes, (Y), one proceeds to the subsequent test block 56, in which it is investigated whether the pixel $PI_S$ is itself clustered (contiguous), that is to say whether at least one of its coordinates x or y differs by not more than one unit from a preceding pixel contained in the group NA, i.e. at least the pixel PI(1). If not, (N), one proceeds to the test block 55. If yes, (Y), the pixel is preserved as belonging to the group NA clustered to the maximum and stored in a memory zone 29 of the RAM 25 (FIG. 1), as indicated in block 57. This pixel also marks the beginning of a blank turn of the spiral as indicated by the block 58. Thereafter on proceeds to the test block 55 to test whether the pixel $PI_S$ marks the end of a completely blank turn, that is to say a turn on which no signal having the designation: clustered to the maximum, has been detected among the NS pixels. If so, (Y), one proceeds to block 59 which marks the end of the programme (END). A complete turn must be understood to be 1 turn plus 1 pixel on the spiral 37. The embodiment just described is long but very complete, that is to say that it allows of the definite removal from the second group of NA pixels the image of any star other than the star aimed at and comprising pixels whose level may be higher than the level of given pixels in the star aimed at.

The last, known, stage of the method consists in effecting, by means of the microprocessor 13, a barycentric calculation on the NA clustered pixels of the measuring field which, together with their positions, are contained in the memory zone 29. The barycentric calculation is performed, on the NA pixels, with removal from the level of each digital pixel the average background level measured along the periphery of the measuring field.

Variations within the skill of the average computer expert are possible to determine the first (NS) and the further (NA) group of pixels.

The embodiments described in the foregoing give every satisfaction when the quantization step for the measurement of the value of the pixels is small. Thus, all the pixels, at least the majority of the pixels of the measuring field, have different values. This results, whatever the direction in which the measuring field is scanned, in the same pixels NS of the highest level being selected. This is, however, no more the case when the quantization step is great, so that the values of the pixels can be classified according to value classes, each class comprising a plurality of pixels, at least for the pixels which do not have the highest level. After scanning, the lowest value class is most often incomplete and on the other hand, this incomplete class is the only class not constituting the same set of pixels along the direction of scan of the measuring field. This detrimental effect, which may be termed algorithmical bias can be obviated by eliminating from the first group of NS pixels those pixels that belong to the class of the lowest levels, which results in a smaller second group of NX, this latter number being variable (not predetermined). So as not to limit too much the number of pixels from which the other group of NA must thereafter be selected, the number NS may be increased, in anticipation of the removal of the last class of pixels, relative to the value mentioned in the foregoing; for example, the value of NS must be brought from 16 to 20. Another way of describing this variation is saying that all the pixels having levels which are identical to the level of the last pixel preserved among the NS are eliminated, so that the NS pixels ultimately preserved form classes having the same level, the number NX being of the order of one tenth of the pixels belonging to the measuring field.

The charge transfer detector described above is in a conventional manner sensitive to photons whose wave lengths are located in the absorption spectrum of silicon, i.e. 0.4 to 1.1μ. However, the ad hoc depositions on the detection matrix render it possible to make this matrix sensitive to ultraviolet rays (band from 0.25μ to 0.4μ). It is alternatively possible to realize charge transfer detectors which are sensitive to infra-red radiation, to electrons or to X-rays.

The present invention relates in general to the detection of the precise position of an emitting source an image of which has been formed on the sensitive zone of a charge transfer detector, more specifically to the tracking of a hot spot in the infra-red region and to the recurring position of the position of stars (or planets) having a high magnitude and a high speed of apparent motion in the presence of a considerable background level, in which case the display of the image linked with the time of integration actually brings the level of the useful signal to very near the background noise. The view finder in accordance with the invention can be used with equal advantage on earth, in combination with a telescope, for example to determine where to aim this telescope on the canopy of heaven, as well as aboard an artifical satellite to determine its orientation, more specifically during a manoeuvering stage, in support of the inertial central station of the satellite.

We claim:

1. A method of measuring the exact position of the energy centre of an image spot of a bright object on a photosensitive detector constituted by a charge transfer detection matrix, said image spot being defocused to allow a subsequent barycentric calculation mode of said exact position and the luminous signal being digitized and thereafter processed in the form of digital pixels, characterized in that, in a measuring field forming a rectangular or square portion of the said detection matrix, the following consecutive operations are performed in each measurement:
   a) the measuring field is centred around the estimated position of the bright object determined in a measuring stage or a just preceding search stage;
   b) selection of a first group of pixels NS of the highest level having a predetermined number of the order of one tenth of the number of pixels of the measuring field;
   c) selection, from the NS pixels, of a further group of NA pixels clustered around the maximum level;

d) a barymetric calculation is performed on the clustered NA pixels of the measuring field.

2. A position measuring method as claimed in claim 1, characterized, in that, for the detection of the NS pixels, the first NS pixels read from the measuring field are entered in a memory zone of NS pixels, whose individual locations contain the value of the pixel and its cartesian coordinates, thereafter the subsequent pixel is compared to the smallest of the preceding pixels and, when it has a higher value than said pixel, it replaces it in said memory, if not, the said pixel is rejected and the same operation is repeated for the next pixel, and so forth to the last pixel read from the measuring field.

3. A position measuring method as claimed in claim 2, characterized, in that, the NS pixels with the highest level are compared to each other and are rearranged in the said NS pixel memory from the highest PI(1) to the lowest PI(NS).

4. A position measuring method as claimed in claim 1 or 2, characterized, in that, in order to select said further group of NA pixels, a helical exploration of the measuring field is performed, centred around the pixel with the maximum level, PI(1) which belongs to the group NA, using the following steps:

p) by comparing the coordinates, it is determined whether the pixel $PS_S$ belongs to the said first group of NS pixels, and, if not, one proceeds to step r;

q) if yes, the position of the pixel $PI_S$ is compared to the positions of the previously selected pixel(s) and, if there is contiguity with at least one of these pixels, the pixel $PI_S$ is preserved as belonging to the said further group of NA pixels, its position is assumed to be the base of a completely empty turn of the helix, thereafter one proceeds to the step r; if there is no contiguity, one proceeds directly to step r;

r) for each consecutive position of the explored pixel $PI_S$ of the helix it is tested whether this pixel marks the end of a completely empty turn, in which case the exploration is ended, if not, one proceeds to the position of the subsequent pixel on the helix.

5. A position measuring method as claimed in claim 1, 2 or 3, using a quantization step which is so great that the pixel values can be arranged according to value classes, each class comprising a plurality of pixels, at least for the pixels which do not have the highest levels, characterized, in that, an additional step b') is inserted between the steps b) and c):

b') from the NS pixels a second group of NX pixels is selected, by suppressing from the group NS, pixels belonging to the lowest value class and that step c) applies to the second group of NX pixels.

6. A position measuring method as claimed in claim 1, 2 or 3, to 5, characterized, in that, the background which constitutes a low reference level for the determination of the value of the digital pixels is formed by the mean value of the pixels constituting the periphery of the measuring field.

7. A method as in claim 1, 2 or 3 for measuring the position of a maneuvering satellite.

* * * * *